United States Patent [19]

Najm et al.

[11] Patent Number: 5,139,288
[45] Date of Patent: Aug. 18, 1992

[54] COUPLING DEVICE FOR PROVIDING ELECTRICAL AND THERMAL INSULATION UNDER HIGH PRESSURE, CRYOGENIC CONDITIONS

[75] Inventors: Habib Najm, Dallas; Cecil J. Davis, Greenville; Gregory E. Gardner, Euless, all of Tex.

[73] Assignee: Texas Instruments Incorporated, Dallas, Tex.

[21] Appl. No.: 575,459

[22] Filed: Aug. 30, 1990

[51] Int. Cl.⁵ ............................................. F16L 23/00
[52] U.S. Cl. ...................................... 285/50; 285/368; 285/398; 285/422; 285/911
[58] Field of Search ....................... 285/50, 53, 54, 47, 285/336, 370, 371, 368, 187, 349, 350, 904, 905, 418, 419, 373, 398, 422, 911, 423

[56] References Cited

U.S. PATENT DOCUMENTS

| | | | |
|---|---|---|---|
| 1,042,730 | 10/1912 | Walquist | 285/911 |
| 2,485,408 | 5/1948 | Pezzillo . | |
| 2,804,773 | 9/1957 | Domingo et al. . | |
| 2,937,229 | 9/1957 | Gard | 285/419 X |
| 3,419,290 | 11/1965 | Campbell et al. | 285/911 X |
| 3,862,771 | 1/1975 | Schwarz | 285/54 |
| 3,894,782 | 7/1975 | Hug . | |
| 4,667,487 | 5/1987 | Miller et al. . | |

FOREIGN PATENT DOCUMENTS 24433 7/1936 Australia ............................... 285/14

OTHER PUBLICATIONS

Shop Note "Large Inexpensive Quartz Viewports for High-Vacuum Systems" Wayne G. Fisher, J. Vac. Sci. Technol. A6(2) Mar./Apr. 1988, pp. 246–247.
Company Brochure, Greene, Tweed & Co., Inc., Kulpsville, Penna.
Company Brochure, Central Plastics Company, Shawnee, Okla.

Primary Examiner—Randolph A. Reese
Assistant Examiner—Tim Aberle
Attorney, Agent, or Firm—Richard A. Stoltz; Rene' E. Grossman; Richard L. Donaldson

[57] ABSTRACT

A coupling device (10) provides sealing members (24), (26), preferably Indium wire O-rings (72), (74), suitable for sealing engagement with an insulating member (28) under cryogenic, high-pressure conditions. Coupling device (10) is designed to couple a first metal pipe attached to a first adapter (12), and a second metal pipe attached to a second adapter (14), so that fluid may be conveyed via bore (36), chamber (84), and bore (48) under such cryogenic high-pressure conditions. According to the invention, the coupling device (10) provides effective sealing under these extreme conditions while also providing thermal and electrical insulation due to the advantageous construction featuring insulating member (28), first collar member (20) and second collar member (22). Thus, two metal pipes may be joined together, one in a high-voltage, low temperature state, the other in an electrically grounded condition, each pipe being maintained substantially in its respective condition by virtue of the insulating properties of coupling device (10).

8 Claims, 2 Drawing Sheets

COUPLING DEVICE FOR PROVIDING ELECTRICAL AND THERMAL INSULATION UNDER HIGH PRESSURE, CRYOGENIC CONDITIONS

BACKGROUND OF THE INVENTION

1. Field of the Invention

This invention relates to a coupling device allowing fluid to flow from one pipe to another pipe. More particularly, it is concerned with a coupling device providing electrical and thermal insulation under high-pressure, cryogenic conditions for silicon wafer processing.

2. Description of the Prior Art

The process of etching in a single-wafer reactor is a rapidly advancing art. Increasingly, process requirements dictate that some etching be done under cryogenic conditions. That is to say, that the silicon wafer, and the chuck the wafer is mounted on, be at cryogenic temperatures during the etching of the wafer. In some applications, helium gas under high pressure is the most suitable agent for cryogenic cooling. In other words, a high-pressure refrigeration system must be coupled with a single-wafer reactor in some circumstances. In order to effectively couple the refrigeration system with the reactor, a coupling device which insures adequate insulation and sealing at high pressure and low temperature must be provided.

In the prior art sealing under cryogenic temperature and sealing under high pressure have been separately addressed by various solutions. For example, under conditions of cryogenic temperature, two metal conduits coupled by an intermediate ceramic piece have been used. The ceramic interface with either conduit has been fused with the use of a very thin metal joint, for example, a joint made of a nickel/iron alloy. This type of structure works well at cryogenic temperatures, but when such a device is subjected to high pressures the thin metal joint gives way and is disadvantageously deformed causing undesirable leakage of the fluid. This device may not be adapted by thickening the metal seal because to do so would destroy the efficacy of the device under cryogenic temperatures. In other words, it is the thin configuration of the metal seal which allows it to contact beneficially under the cryogenic conditions.

Under high-pressure conditions synthetic-resin seals, such as "TEFLON" O-rings, have often been used successfully. Synthetic-resin seals (without any kind of metal reinforcement), however, tend to fail at cryogenic temperatures.

Additionally, while a synthetic resin such as "TEFLON" works adequately well in sealing with ceramic under high-pressure conditions, an additional problem with metal seals, e.g. copper seals, is that there is a tendency to damage the ceramic portion of the interface because the metal is so much harder and the ceramic is relatively incompressible and brittle compared to the metal.

Thus there is a need for a device which provides electrical and thermal insulation between metal conduits while providing adequate sealing under high-pressure, cryogenic conditions.

SUMMARY OF THE INVENTION

The problems outlined above are in large measure solved by the device in accordance with the present invention. That is to say, the device hereof provides structure for effectively electrically and thermally insulating one conduit from another under high-pressure, cryogenic conditions.

The coupling device in accordance with the present invention provides two electrically and thermally conductive conduits insulated from one another by insulating material such as "PLEXIGLAS" or a ceramic. Each conduit includes a face end and an axial bore formed therethrough.

Sealing members, such as Indium O-rings, are housed on the respective face ends of the conduits. According to the invention, the sealing members are sufficiently soft (i.e. pliant) to seal, with an insulating member receiving the respective face ends of the conduits. The sealing action takes place in such a fashion and the sealing members are sufficiently soft such that the insulating member is not damaged.

An axial compressor (i.e. compression apparatus) is secured to both the first and second conduit members so as to achieve a tight seal by axially compressing the face ends of the respective conduit members. Typically the securing axial compressor is metal bolts connecting compressive disks, but alternatively, the securing axial compressor can be insulating material to further avoid electrical conductivity between the first and second conduit members, and thermal conductivity between the conduit members and the axial compressor.

In preferred embodiments, a collar member is received on each conduit member to further electrically and thermally insulate each conduit from the axial compressor. In this manner, metal bolts and disks can be used without creating electrical and thermal conductivity between the conduit members. The collar members also present an outer radius of sufficient magnitude to deter RF induction between the disks and the conduits.

The sealing members are advantageously able to withstand the stresses of cryogenic temperatures and high pressures and yet maintain adequate sealing.

DESCRIPTION OF THE PREFERRED EMBODIMENTS

Figure 1:
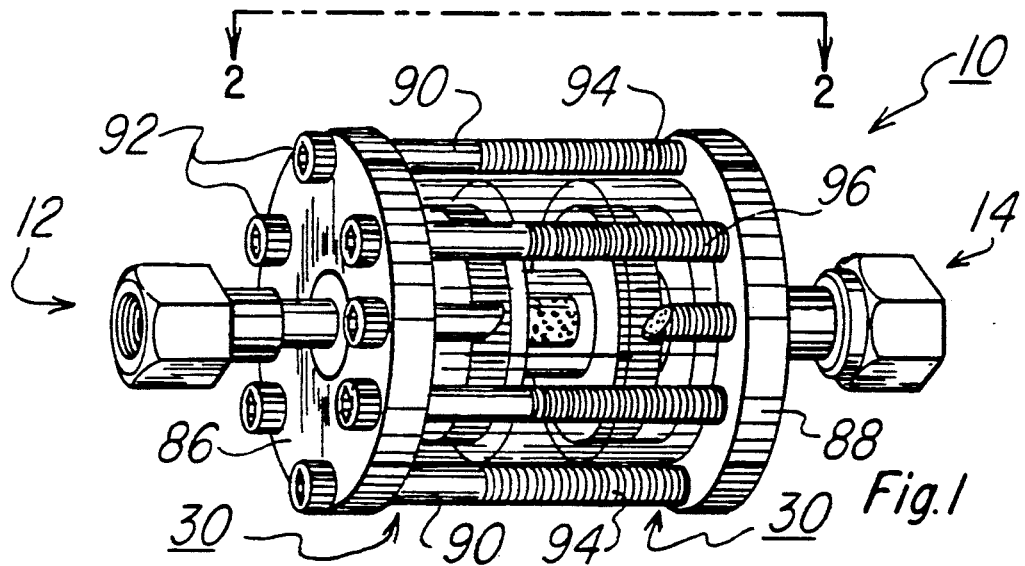
FIG. 1 is a perspective view of a coupling device in accordance with the present invention, with first and second adapters attached to respective ends thereof.

Referring now to the drawing in general, and FIG. 1 in particular, a coupling device 10 providing electrical and thermal insulation in high-pressure, cryogenic conditions is shown with threaded first and second adapters 12 and 14, such adapters 12, 14 being suitable for connection respectively with first and second metal pipes (not shown) for carrying high-pressure, cryogenic fluid. Coupling device 10 is used to provide electrical and thermal insulation between the first pipe and the second pipe. For example, the first pipe might be electrically grounded and in thermally conductive communication with an ambient-temperature environment while the second pipe might be at high RF voltage and at a cryogenic temperature. In accordance with the invention, coupling device 10 provides adequate sealing for movement of cryogenic fluid under high-pressure while providing electrical and thermal insulation.

Figure 2:
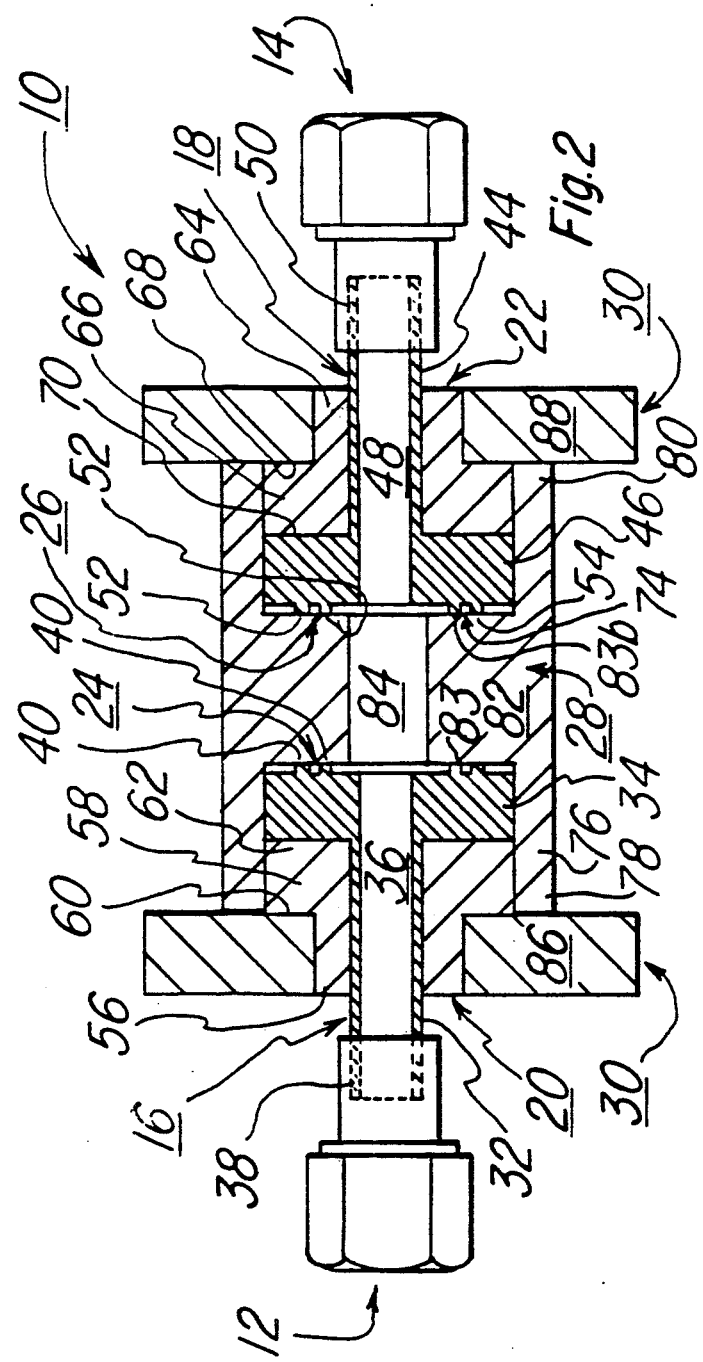
FIG. 2 is a sectional view of the coupling device taken along line 2—2 of FIG. 1.

Referring to FIG. 2, coupling device 10 has a first conduit member 16, a second conduit member 18, a first collar member 20, a second collar member 22 a first sealing member 24, a second sealing member 26, an insulating member 28, and axial compressor 30 (portions of which are not shown in FIG. 2 for clarity of illustration, see also FIG. 1).

First conduit member 16 includes a tubular portion 32, disk-like face end 34, and an axially elongated bore 36 formed through first conduit member 16. Face end 34 has a greater outer radius than tubular portion 32 as will be readily observed. Tubular portion 32 has a pipe end 38 on which adapter 12 is secured for attachment to the first metal pipe. For example, adapter 12 may be welded to pipe end 38, or any other method may be used which insures that no helium leakage will occur thereat.

Figure 3:
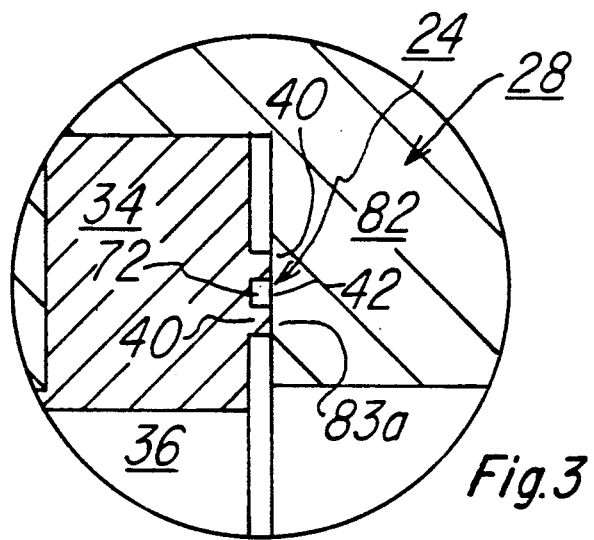
FIG. 3 is a detailed sectional view of one portion of the coupling device as seen in FIG. 2.

Referring to FIGS. 2 and 3, face end 34 has two annular concentric lips 40 which form an annular groove 42. Note that the detailed view of FIG. 3 depicts the upper portion of the face end 34 of first conduit member 16.

Referring once again to FIG. 2, second conduit member 18 includes a tubular portion 44, a disk-like face end 46, and an axially elongated bore 48. Face end 46 has a greater outer radius than tubular portion 44. Face end 46 has two annular, concentric lips 52 which form an annular grove 54.

Tubular portion 44 has a pipe end 50 which may be adapted for attachment to adapter 14 in a manner as described with pipe end 38 of first conduit member 16.

First collar member 20 has a pipe end 56 and a face end 58, the outer radius of face end 58 being greater than the outer radius of pipe end 56. The inner radius of pipe end 56 and face end 58 are substantially equal in order to snugly receive tubular portion 32 of first conduit member 16. First collar member 20 is made of an insulating material such as ceramic or a synthetic resin such as "PLEXIGLAS". Face end 58 has a disk-interface portion 60 and a flange-interface portion 62.

Second collar member 22 has a pipe end 64 and a face end 66, the face end 66 having a greater outer radius than that of pipe end 64. The inner radius of face end 66 and pipe end 64 are substantially equal to snugly receive tubular portion 44 of second conduit member 18. Second collar member 22 is likewise made of an insulating material such as ceramic or a synthetic resin such as "PLEXIGLAS". Face end 66 has a disk-interface portion 68 and a flange-interface portion 70.

Referring to FIG. 3, first sealing member 24, in the form of a first Indium O-ring 72 is shown seated in groove 42 of face end 34 of first conduit member 16. O-ring 72 is depicted as being white in cross-section for ease of illustration.

Referring once again to FIG. 2, second sealing member 26 in the form of a second Indium O-ring 74 is shown sitting snugly in groove 54.

The substantially incompressible, electrically and thermally insulating member 28 is barrel shaped so that in cross section it presents a sideways H-pattern. Insulating member 28 is made of an insulating material such as a synthetic-resin (e.g. "PLEXIGLAS"), a ceramic, or the like. The insulating material should be hard enough not to break or chip when brough into sealing engagement with first sealing member 24 and second sealing member 26. Yet it cannot be overly pliant. Insulating member 28 must be rigid enough to seal properly against sealing members 24, 26. That is to say, insulating member 28 must be relatively harder than sealing members 24, 26. Insulating member 28 must also be able to withstand cryogenic, high-pressure conditions.

Insulating member 28 has an annular outer housing 76 with ends 78, 80. Insulating member 28 also has an inner housing 82, including a first sealing surface 83a and a second sealing surface 83b which are respectively in intimate sealing engagement with first sealing member 24 and second sealing member 26 and corresponding lips 40, 52. (See also FIG. 3). Inner housing 82 forms a chamber 84 in fluid communication with bores 36 and 48.

Referring now to FIG. 1, axial compressor 30 includes first disk 86 and second disk 88 (see also FIG. 2) and a plurality of threaded bolts 90, each bolt 90 having a head end 92 and a thread end 94. First disk 86 has a plurality of head bores (not shown for ease of illustration), each for receiving one bolt 90 therethrough. Second disk 88 has a plurality of threaded bores 96 each for receiving one thread end 94 therein. The head bores, threaded bores 96 and bolts 90 are not shown in FIG. 2 for clarity of illustration.

For assembly of coupling device 10, and once again referring to FIG. 2, first collar member 20 is placed on first conduit member 16 so that the flange-interface portion 62 of first collar member 20 abuts face end 34 of first conduit member 16 as shown. Likewise, second collar member 22 is placed on second conduit member 18 so that flangeinterface portion 70 of second collar member 22 abuts flange member 46 of second conduit member 18 as shown.

First sealing member 24 is mounted in groove 42. Second sealing member 26 is mounted in groove 54.

First conduit member 16 and first collar member 20 are now assembled with insulating member 28 so as to be partially received within the confines of end 78 of outer housing 76 as shown. First conduit member 16 is positioned so that lips 40 and first sealing member 24 abut first sealing surface 83a of inner housing 82 of insulating member 28.

Likewise second conduit member 18 and second collar member 22 are now assembled with insulating member 28 so as to be partially received within the confines of end 80 of outer housing 76 as shown. Second conduit member 18 is positioned so that lips 52 and second sealing member 26 abut the inner housing 82.

First disk 86 is now placed on the pipe end 56 of first collar member 20 so that the disk-interface portion 60 abuts disk 86. Likewise second disk 88 is now placed on pipe end 64 of second collar member 22 so that disk-interface portion 68 abuts disk 88.

Referring to FIG. 1, the thread end 94 of one bolt 90 is now placed through one corresponding head bore of first disk 86 and then partially threaded into one threaded bore 96 of second disk 88. This procedure is then repeated for the remaining five bolts 90. Then all six bolts 90 are thoroughly tightened so that first disk 86 and second disk 88 are axially compressed, thereby compressing face end 34 of first conduit member 16 and first sealing member 24 against first sealing surface 83a of insulating member 28, and also to axially compress face end 46 of second conduit member 18 and second sealing member 26 against second sealing surface 83b of insulating member 28.

According to the invention, and once again referring to FIG. 2, the pliancy of first sealing member 24 and second sealing member 26 is selectively predetermined so that insulating member 28 is not damaged by compressive engagement with sealing members 24, 26. In the context of the present invention, pliant means: (1) soft enough to fluidly yield to a relatively harder material when brought into compressive engagement therewith; and (2) plastic enough to fluidly deform to a substantially-fixed, new shape when brought into compressive engagement with a relatively harder material. In this fashion sealing members 24, 26 are fluidly deformed from an original shape to a substantially-fixed sealing shape when brought into compressive engagement with insulating member 28. In other words, one of the requirements of the sealing members is that they be some soft, pliant metal or other suitably pliant material such that there is no damage to first sealing surface 83a or second sealing surface 83b of insulating member 28 upon axial compressive engagement therewith. Hence, first sealing member 24 and second sealing member 26 will not chip, shatter or otherwise impair the structural integrity of the inner housing 82 upon assembly and use, but rather yield under compression exerted by axial compressor 30 to establish sealing engagement with lips 40, 52, first sealing surface 83a and second sealing surface 83b.

It should be noted that other materials and configurations can be used for first sealing member 24 and second sealing member 26. For example solder in an appropriately annular form might well function as a sealing member. Likewise sealing members might be formed of tin. In addtion a "TEFLON" seal could possibly be used with a stainless steel metal spring, provided the spring have sufficient tension to keep the "TEFLON" portion of the seal from inappropriately deforming during sealing and operation. As stated above, the critical parameters in this regard are that the sealing material be sufficiently soft so as not to damage insulating member 28 and yet exhibit sufficient plasticsity so that the sealing member plastically deforms to the sealing shape during assembly and maintains that shape in a substantially-fixed manner. In other words, any combination of material and shape for a sealing member must be such that it is sufficiently pliant.

It should be noted that first disk 86 and second disk 88 don't compress outer housing 76 of insulating member 28. Rather, first disk 86 and second disk 88 exert compressive forces on disk-interface portions 60 and 68, respectively, of first collar member 20 and second collar member 22. Thus, the surface area of the disk-interface portions 60, 68 should be sufficient magnitude to maintain the structural integrity of first collar member 20 and second collar member 22 under a suitable range of pressures exerted by axial compressor 30.

Adapters 12 and 14 are then secured (e.g. by welding) to first conduit member 16 and second conduit member 18 respectively, at which time the first and second metal pipes may be respectively attached to adapters 12, 14 to established a condition of fluid communication.

A specific application in the use of coupling device 10 will now be described for purposes of illustration. It should be understood, however, that a wide range of applications are possible for coupling device 10 and such applications as well as modifications of coupling device 10 are contemplated as being within the scope and spirit of the invention. In this particular application a single-wafer reactor, used for processing a semiconductor wafer (e.g. etching), includes a chuck suitable for operationally positioning a wafer to be processed thereon. As is well known in the art, many etching processes now require cryogenic temperatures (e.g. on the order of −150° C.) and thus the chuck must be brought to approximately this temperature inside the reactor. In this particular application the agent for cooling the chuck to this temperature is gaseous helium. The gaseous helium is introduced to the chuck via a conduit such as a metal pipe. In this context, a metal pipe suitable for conveying gaseous helium at a cryogenic temperature is connected to second adapter 14. Thus, second adapter 14 and certain portions of coupling device 10 are in thermally conductive communication with the chuck in the reactor which is maintained at a cryogenic temperature during operation. First adapter 12 is situated close to the exterior wall of the single wafer reactor. First adapter 12 is secured to a first metal pipe which passes through a sealed aperture in the outer wall of the reactor so that the first metal pipe is connected outside of the reactor to a cooling site where helium is cooled to the appropriate cryogenic temperature (e.g. a liquid nitrogen loop). Thus, certain portions of coupling device 10 may be thermally conductive communication with the ambient temperature outside the reactor and thus the necessity arises for thermally insulating the portions of coupling device 10 in thermally conductive communication with the ambient temperature, from those portions of coupling device 10 in thermally conductive communication with the chuck at cryogenic temperatures.

During operation, the chuck will also be at high RF voltages (e. g. for etching purposes). Thus the need also arises for electrically insulating first adapter 12 from second adapter 14 since first adapter 12 will be in electrically conductive communication with the outer wall of the reactor which is electrically grounded. Also the first metal pipe must be insulated from the high RF voltages of the second pipe for safety purposes, since most of the first metal pipe will be outside of the housing.

The helium is pumped from the liquid nitrogen cooling loop through the first metal pipe into first adapter 12 to the first bore 36, chamber 84, second bore 48, through second adapter 14, into the second metal pipe and hence to its ultimate destination at the chuck where it performs the cryogenic cooling function. The helium is then pumped through a return pipe back through the reactor wall and into the cooling loop so that it may be recooled. Thus it will be seen that two units of the coupling device 10 should be used in this particular application, one for the introduction of the cooled helium gas for the purpose of cooling the chuck, and one for the purpose of conveying the relatively warmer helium gas back to the nitrogen cooling loop for cyclic cooling thereof. Thus, both units of coupling device 10 provide an electrical and thermal break in communication between the chuck which is at high RF voltage and cryogenic temperature and the exterior wall of the reactor which is at ambient temperature and electrically grounded.

It is also important that second disk 88 have a sufficiently large inner radius in order to practically avoid electrical induction between second conduit member 18 and second disk 88, caused by RF voltage in second condiut member 18.

In an alternative embodiment, first disk 86 and/or second disk 88 and/or bolts 90 could be made of insulating material to eliminate the necessity of first collar member 20 and second collar member 22 or simply to augment the insulation action. Commercial availability of metal bolts makes the preferred embodiment, however, practically advantageous. According to the invention, cryogenic fluid (such as helium gas) flowing under high pressure will be effectively sealed by first sealing member 24 and second sealing 26. First sealing member 24 and second sealing member 26, for example in the form of Indium wire O-rings, will be able to contract adequately at cryogenic temperatures (as opposed to an unsupported synthetic resin such as "TEFLON"), and will be able to withstand high pressures (as opposed to thin, nickel/iron joints used in the prior art). Thus, coupling device 10 will provide thermal and electrical insulation while withstanding high pressure under cryogenic conditions. Under test conditions, coupling device 10 has provided adequate sealing at pressures ranging up to 450 psig and temperatures falling as low as 77° K. (i.e. $-196°$ C.). It is believed that the invention described herein may well advantageously perform at even higher pressures and lower temperatures.

Although the invention has been described in detail herein with reference to its preferred embodiment and certain described alternatives, it is to be understood that this description is by way of example only, and is not to be construed in a limiting sense. It is to be further understood that numerous details of the embodiments of the invention, and additional embodiments of the invention, will be apparent to, and may be made by persons of ordinary skill in the art having reference to this description. It is contemplated that all such changes and additional embodiments are within the spirit and true scope of the invention as claimed below.

What is claimed is:

1. A coupling device used with semiconductor manufacturing equipment, for conveying fluid from a first pipe to a second pipe, the device comprising:
   a first conduit member having a radially directed face end, and an axially elongated bore formed therethrough;
   a first sealing member mounted on said radially directed face end of said first conduit member;
   an electrically and thermally insulating first collar member coaxially received on said first conduit member;
   a substantially incompressible, electrically insulating member having a first sealing surface and a second sealing surface, said first sealing surface engaged with said radially directed face end of said first conduit member and said first sealing member, said insulating member further having an axially elongated chamber, said chamber of said insulating member being in fluid communication with said bore of said first conduit member;
   a second sealing member engaged with said second sealing surface of said insulating member; said first and second sealing members include pliancy means for rendering said sealing members deformable.
   a second conduit member having a radially directed face end engaged with said second sealing surface of said insulator and mountingly receiving said second sealing member, said second conduit member having an axially elongated chamber formed therethrough, said chamber of said second conduit member being in fluid communication with said bore of said insulating member, said insulating member including structure electrically insulating said first conduit member from said second conduit member; and
   an axial compressor including a first disk, a second disk, and a plurality of bolts, said axial compressor secured to said first collar member and said second conduit member so as to axially press said first collar member and thereby press said radially directed face end of said first conduit member against said first sealing member and axially compress said first sealing member against said first sealing surface of said insulating member, and so as to axially press said radially directed face end of said second conduit member and axially compress said second sealing member against said second sealing end of said insulating member, said pliancy means of said first sealing member and said second sealing member being selectively predetermined so that said insulating member is not damaged by compressive engagement with said first sealing member and said second sealing member and further so that said first sealing member and said second sealing member are deformed into a substantially-fixed seal with said insulating member and whereby said first collar member and said insulating member are positioned so that said first conduit member and said second conduit member are electrically insulated.

2. The device of claim 1, wherein said first sealing member and said second sealing member are made of Indium wire.

3. The device of claim 1, wherein said insulating member is an integral piece of "PLEXIGLAS".

4. The device of claim 1, wherein said first conduit member and said second conduit member are made of stainless steel.

5. The device of claim 1, wherein said axial compressor includes said first disk coaxially received on said first conduit member and abuttingly engaging said insulating member in proximity to said first sealing surface, said axial compressor further including said second disk coaxially received on said second conduit member and abuttingly engaging said insulating member in proximity to said second sealing surface, said first disk and said second disk each including a plurality of threaded bores, and said plurality of bolts threadingly received in one of said first disk or said second disk to axially compress said radially directed face end of said first conduit member and said first sealing member against said first sealing surface of said insulating member, and so as to axially compress said face end of said second conduit member and said second sealing member against said second sealing surface of said insulating member.

6. The device of claim 5, further comprising:
   an electrically and thermally insulating second collar member coaxially received on said second conduit member, said first and second collar members and said insulating member being positioned so that said first conduit member and said second conduit member are electrically and thermally insulated from said axial compressor.

7. The device of claim 6, wherein said first disk, said second disk and said bolts are made of stainless steel.

8. The device of claim 6, wherein said first collar member and said second collar member are made of "PLEXIGLAS".

* * * * *